United States Patent
Zhao

(10) Patent No.: US 12,463,754 B2
(45) Date of Patent: Nov. 4, 2025

(54) METHOD AND DEVICE FOR INDICATING FEEDBACK MODE, METHOD FOR DETERMINING FEEDBACK MODE

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 448 days.

(21) Appl. No.: 17/799,256

(22) PCT Filed: Feb. 14, 2020

(86) PCT No.: PCT/CN2020/075299
§ 371 (c)(1),
(2) Date: Aug. 11, 2022

(87) PCT Pub. No.: WO2021/159476
PCT Pub. Date: Aug. 19, 2021

(65) Prior Publication Data
US 2023/0072122 A1 Mar. 9, 2023

(51) Int. Cl.
*H04L 1/1822* (2023.01)
*H04L 1/1812* (2023.01)
*H04L 1/1867* (2023.01)
*H04W 72/20* (2023.01)

(52) U.S. Cl.
CPC .......... *H04L 1/1822* (2013.01); *H04L 1/1896* (2013.01); *H04W 72/20* (2023.01); *H04L 1/1812* (2013.01)

(58) Field of Classification Search
CPC ... H04L 1/1896; H04L 1/1822; H04L 1/1812; H04L 2001/0093; H04W 72/0406; H04W 72/20; H04W 72/25; H04W 72/27; H04W 72/29
See application file for complete search history.

(56) References Cited

U.S. PATENT DOCUMENTS

2019/0123923 A1  4/2019  Belleschi et al.
2022/0295517 A1* 9/2022  Hahn ................ H04W 72/0446
2022/0377722 A1* 11/2022  Yao ...................... H04L 5/0055

FOREIGN PATENT DOCUMENTS

CN    110178389 A    8/2019

OTHER PUBLICATIONS

U.S. Appl. No. 62/886,634,Specification_-_Not_in_English,Aug. 1, 2019 (Year: 2019).*

(Continued)

*Primary Examiner* — Ji-Hae Yea
(74) *Attorney, Agent, or Firm* — Arch & Lake LLP

(57) ABSTRACT

A method for indicating a feedback mode comprises the steps that a first device obtains configuration information, the configuration information being used for indicating whether the first device supports an optional function of hybrid automatic repeat request (HARQ) feedback; the first device sends sidelink control information (SCI) to a second device based on the configuration information, wherein the SCI comprises a first type of SCI and a second type of SCI, and one of the first type of SCI and the second type of SCI comprises a first field, the first field is used for indicating an HARQ feedback mode of multicast communication data transmission.

18 Claims, 3 Drawing Sheets

(56) References Cited

OTHER PUBLICATIONS

U.S. Appl. No. 62/886,634,Specification,Feb. 13, 2022 (Year: 2022).*
InterDigital, Inc. ("Physical Layer Structure for NR V2X Sidelink", 3GPP TGS RAN WG1 #99, R1-1913274, Nov. 18-22, 2019) (Year: 2019).*
LG Electronics ("Discussion of physical layer structure for NR sidelink", 3GPP TSG-RAN WG1 Meeting #99, R1-1912586, Nov. 18-22, 2019) (Year: 2019).*
The Partial Supplementary European Search Report for EP application 20919015.6, dated Feb. 23, 2023,(13p).
Fraunhofer HHI, Fraunhofer IIS, "Physical Layer Procedures for NR V2X", 3GPP TSG RAN WG1 #99, R1-1912290, Reno, USA, Nov. 18-22, 2019, (6p).
Sequans Communications, "On HARQ procedure for NR sidelink", 3GPP TSG RAN WG 1 Meeting #99, RI-1913012, Reno, USA Nov. 18-22, 2019, (6p).
CATT, "Sidelink physical layer procedures in NR V2X",3GPP TSG RAN WG 1 Meeting #99, RI-1912159, Reno, USA Nov. 18-22, 2019, (8p).
Apple, "Physical Layer Procedures for NR V2X Sidelink", 3GPP TSG RAN WG 1 #99, RI-1912814, Reno, USA Nov. 18-22, 2019, (6p).
The First CNOA issued in Application No. 202080000286.7 dated Apr. 28, 2023, with English translation, (25p).
International Search Report of PCT/CN2020/075299 dated Nov. 25, 2020 with English translation, (4p).
Nokia, "Discussion of physical layer procedures for sidelink", 3GPP TSG-RAN WG1 Meeting #97, R1-1906079, Reno, NV, May 13-17, 2019, (9p).
Ericsson, "On the Support of HARQ feedbacks Over Sidelink", 3GPP TSG-RAN WG2 #106, R2-1907351, Reno, NV, May 13-17, (3p).
Huawei, Design and contents of PSCCH and PSFCH, 3GPP TSG RAN WG1 Meeting #96bis, R1-1904689, Xi'an, China, Apr. 8-12, 2019, (9p).
Office Action issued in JP application No. 2022-548073, dated Jul. 11, 2023, with English translation, (15p).
LG Electronics, "Discussion on physical layer structure for NR sidelink", 3GPP TSG RAN WG1 #99, R1-1913235, Reno, USA, Nov. 18-22, 2019, (37p).
Xiaomi, "Discussion on physical layer structure for 5G V2X", 3GPP TSG RAN WG1 #99, R1-1913074, Reno, USA, Nov. 18-22, 2019, (5p).
Request for the Submission of an Opinion issued in Application No. 10-2022-7030938 dated Jan. 27, 2025 with English translation, (17p).
InterDigital, Inc.,"Physical Layer Structure for NR V2X Sidelink," 3GPP TSG RAN WG1 #99, R1-1913274, Reno, U.S.A, Nov. 18-22, 2019, (17p).
LG Electronics, "Feature lead summary #3 for AI 7.2.4.5 Physical layer procedures for sidelink," 3GPP TSG RAN WG1 #99, R1-1913572, Reno, USA, Nov. 18-22, 2019, (44p).

* cited by examiner

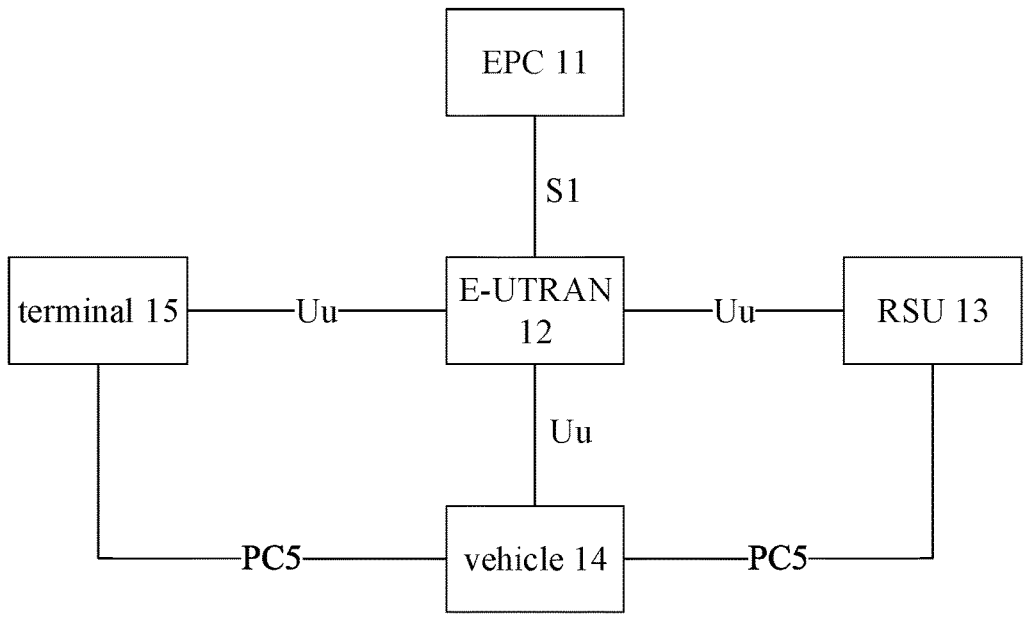

FIG. 1

| obtaining by a first device, configuration information, wherein the configuration information is configured to indicate whether the first device supports an optional function of hybrid automatic repeat request (HARQ) feedback | 201 |

| sending by the first device, sidelink control information (SCI) to a second device based on the configuration information, wherein the SCI comprises a first type of SCI and a second type of SCI, one of the first type of SCI and the second type of SCI comprises a first field, and the first field is configured to indicate a HARQ feedback mode for data transmission in multicast communication | 202 |

FIG. 2

| receiving by a second device, SCI sent by a first device, wherein the SCI comprises a first type of SCI and a second type of SCI, one of the first type of SCI and the second type of SCI comprises a first field, and the first field is configured to indicate a HARQ feedback mode for data transmission in multicast communication | 301 |

| determining by the second device, the HARQ feedback mode for data transmission in multicast communication associated with the SCI, based on configuration information and the first field in the SCI, wherein the configuration information is configured to indicate whether the second device supports an optional function of HARQ feedback | 302 |

FIG. 3

METHOD AND DEVICE FOR INDICATING FEEDBACK MODE, METHOD FOR DETERMINING FEEDBACK MODE

CROSS-REFERENCE TO RELATED APPLICATION

This application is the U.S. national phase application of International Application No. PCT/CN2020/075299, filed on Feb. 14, 2020, the entire content of which is incorporated herein by reference for all purposes.

TECHNICAL FIELD

The disclosure relates to a field of communication technologies, and more particularly, to a method and an apparatus for indicating a feedback mode, a method and an apparatus for determining a feedback mode, and a storage medium.

BACKGROUND

Vehicle to Everything (V2X) technology, also known as the Internet of Vehicles technology, is a new generation of information and communication technology that connects a vehicle to everything. V represents the vehicle, and X represents any object that interacts with the vehicle, such as a vehicle, people, traffic roadside infrastructure and a network, and so on.

In the V2X system, devices may communicate directly with each other via a sidelink, which may be called sidelink communication. The sidelink communication may include a plurality of types: a unicast, a multicast, and a broadcast. For the unicast and multicast, the receiving device needs to feedback a hybrid automatic repeat request (HARQ) after receiving the communication data, so as to ensure normal transmission of data.

SUMMARY

According to a first aspect of the disclosure, a method for indicating a feedback mode is provided, which is applied to a first device. The method includes: obtaining by a first device, configuration information, in which the configuration information is configured to indicate whether the first device supports an optional function of hybrid automatic repeat request (HARQ) feedback; and sending by the first device, sidelink control information (SCI) to a second device based on the configuration information, in which the SCI includes a first type of SCI and a second type of SCI, one of the first type of SCI or the second type of SCI includes a first field, and the first field is configured to indicate a HARQ feedback mode for data transmission in multicast communication.

According to a second aspect of the disclosure, a method for determining a feedback mode is provided, which is applied to a second device. The method includes: receiving by a second device, sidelink control information (SCI) sent by a first device, in which the SCI includes a first type of SCI and a second type of SCI, one of the first type of SCI or the second type of SCI includes a first field, and the first field is configured to indicate a hybrid automatic repeat request (HARQ) feedback mode for data transmission in multicast communication; and determining by the second device, the HARQ feedback mode for data transmission in multicast communication associated with the SCI, based on configuration information and the first field in the SCI, in which the configuration information is configured to indicate whether the second device supports an optional function of HARQ feedback.

According to a third aspect of the disclosure, a first device for indicating a feedback mode includes a processor; and a non-transitory computer-readable storage medium coupled to the processor and storing programming instructions for execution by the processor. The programming instructions instruct the processor to: obtain configuration information, wherein the configuration information is configured to indicate whether the first device supports an optional function of hybrid automatic repeat request (HARQ) feedback; and send sidelink control information (SCI) to a second device based on the configuration information, wherein the SCI comprises a first type of SCI and a second type of SCI, one of the first type of SCI or the second type of SCI comprises a first field, and the first field is configured to indicate a HARQ feedback mode for data transmission in multicast communication.

It should be understood that the above general description and the following detailed description are exemplary and explanatory only, which are not restrictive of the disclosure.

BRIEF DESCRIPTION OF THE DRAWINGS

The accompanying drawings here, which are incorporated in and constitute a part of this specification, illustrate embodiments consistent with the disclosure and serve to explain the principles of the disclosure together with the specification.

FIG. 1 is a schematic diagram of a network architecture according to an example of the disclosure.

FIG. 2 is a flowchart of a method for indicating a feedback mode according to an example.

FIG. 3 is a flowchart of a method for determining a feedback mode according to an example.

DETAILED DESCRIPTION

Figure 4:
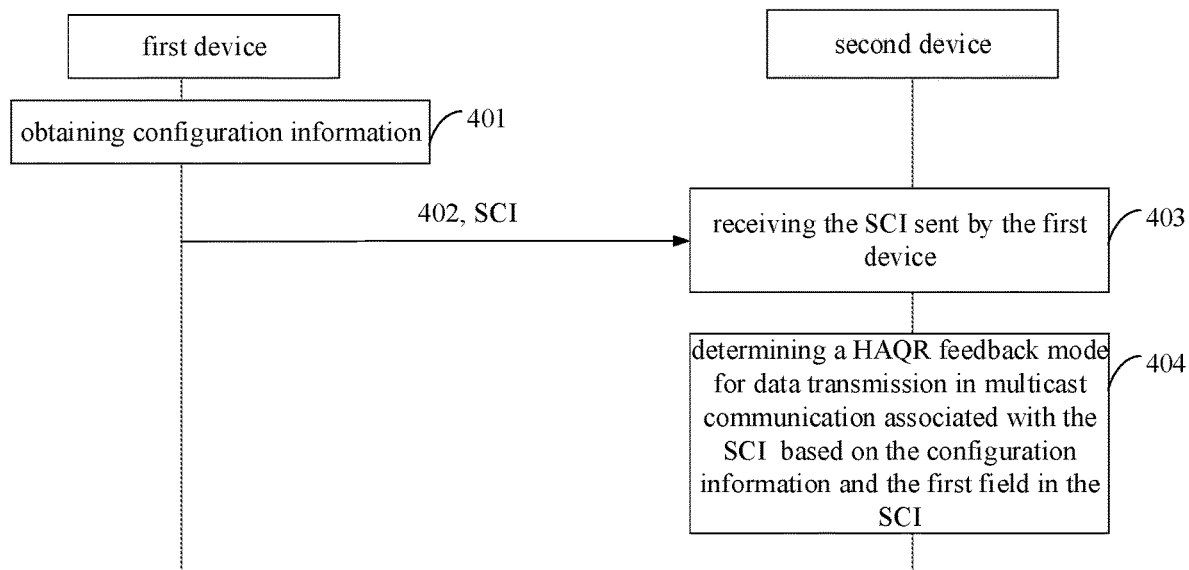
FIG. 4 is a schematic diagram of an interaction process between a method for indicating a feedback mode and a method for determining a feedback mode according to an example.

Embodiments will be described in detail herein, examples of which are illustrated in the accompanying drawings. Where the following description refers to the drawings, the same numerals in different drawings refer to the same or similar elements unless otherwise indicated. The implementations described in the following embodiments do not represent all implementations consistent with the embodiments of the disclosure. Rather, they are merely examples of apparatuses and methods consistent with some aspects of the embodiments of the disclosure, as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The technical solutions according to the embodiments of the disclosure may include the following beneficial effects: in the embodiments of the disclosure, according to the configuration information for indicating whether the first device supports the optional function of HARQ feedback, the first device selects whether the first type of SCI nor the second type of SCI is used for carrying the first field, which indicates the HARQ feedback mode for data transmission in multicast communication. This indication method is flexible. The second device may accurately determine the feedback mode for multicast communication according to the configuration information for indicating whether the second device supports the optional function of HARQ feedback and the first field in the SCI.

In the related art, the multicast communication supports two HARQ feedback modes, and a sending device needs sidelink control information (SCI) to indicate the receiving device which HARQ feedback mode is used for feedback.

In the related art, modes of V2X interaction information include: a mode of Vehicle to Vehicle (V2V), a mode of Vehicle to Infrastructure (V2I), a mode of Vehicle to Pedestrian (V2P), V a mode of vehicle to Network (V2N).

FIG. 1 shows a schematic diagram of a network architecture according to an embodiment of the disclosure. The network architecture is described by taking a long term evolution (LTE) system as an example. As shown in FIG. 1, the network architecture may include: evolved packet core (EPC) 11, an evolved UMTS terrestrial radio access network (E-UTRAN) 12, a road side unit (RSU) 13, a vehicle 14 and a terminal 15.

The EPC11 is a core network of the LTE system. The core network includes several core network devices. The functions of the core network devices are mainly to provide user connections, manage users, bear services, and provide an interface to an external network serving as a bear-network. For example, the EPC 11 includes a mobility management entity (MME), a serving gateway (S-GW), and a PDN gateway (P-GW). The E-UTRAN 12 is an access network of the LTE system. The access network includes several access network devices. The access network device may be a base station (BS), which is a device deployed in the access network to provide the terminal 15 with a wireless communication function. The base station may include various forms of a macro base station, a micro base station, a relay station, an access point and so on. In a system with different radio access technologies, the names of devices with base station functions may be different. For example, in LTE systems, the devices with base station functions are called eNodeBs or eNBs. In 5G New Radio (NR) systems, the devices with base station functions are called gNodeBs or gNBs.

The terminal 15 may include various devices with wireless communication functions such as handheld devices, vehicle-mounted devices, wearable devices, computing devices, other processing devices connected to a wireless modem, as well as various forms of user equipment (UE), mobile stations (MS), terminal devices and the like. For the convenience of description, the devices mentioned above are collectively referred to as terminals. The access network devices communicate with the core network devices through some air interface technology, such as a Si interface. The access network devices also communicate with the terminal 15 through some air interface technology, such as a Uu interface. The Uu interface refers to an interface between UE and UTRAN. The S1 interface and the Uu interface are known in the art of air interface technology.

The RSU 13 may include a microwave read/write device and a controller. The RSU 13 is used to receive information reported by the vehicle 14 and send traffic information of the road to the vehicle 14. The RSU 13 has data storage and processing capabilities, and may quickly and accurately detect the traffic information such as road conditions and driving conditions, process the traffic information and then send the processed traffic information to the vehicle 14. The RSU13 may communicate with the access network device through some air interface technology, such as a Uu interface.

The vehicle 14 may be an autonomous vehicle or a non-autonomous vehicle. The vehicle 14 is provided with a vehicle-mounted communication device, through which the vehicle 14 communicates with other vehicles, the terminal 15 or other devices, such as the RSU 13. The vehicle-mounted communication device may be a device integrated in a vehicle-mounted communication box (e.g., Telematics BOX, T-BOX), or a device separated from the vehicle body. In addition, the vehicle-mounted communication device may be assembled in the vehicle 14 before the vehicle 14 leaves the factory, or may be assembled in the vehicle 14 after the vehicle 14 leaves the factory. The vehicle-mounted communication device of the vehicle 14 may communicate with the terminal 15 via a sidelink communication interface (e.g., a PC5 interface). For example, the terminal 15 sends its own location information to the vehicle 14 via the PC5 interface. The vehicle-mounted communication device of the vehicle 14 may communicate with the RSU 13 via a sidelink communication interface (e.g., a PC5 interface). For example, the RSU 13 sends traffic information of a distant road to the vehicle 14 via the PC5 interface. In addition, the vehicle-mounted communication device of the vehicle 14 may communicate with the access network device (e.g., the eNB of the LTE system) via some air interface technology, such as a Uu interface.

The communication system shown in FIG. 1 may implement a V2X service scenario, and the communication system may further include devices such as a V2X application server and a V2X control function node, which are not limited in this embodiment of the disclosure.

It should be noted that, in the communication system shown in FIG. 1, the LTE system is taken as an example for description. The technical solutions described in the disclosure may be applied to a LTE system, or other wireless communication systems with various wireless access technologies, such as systems using access technologies such as code division multiple access (CDMA), frequency division multiple access (FDMA), time division multiple access (TDMA), orthogonal frequency division multiple access (OFDMA), single carrier frequency division multiple access (SC-FDMA). In addition, the technical solutions may also be applied to an evolution system of the LTE system, such as a next-generation network system, that is, a 5th-generation (5G) system, and the like. In addition, the terms "network" and "system" in the embodiments of the disclosure are often used interchangeably, but those skilled in the art may understand their meanings.

The communication systems and service scenarios described in the embodiments of the disclosure are for the purpose of illustrating the technical solutions of the embodiments of the disclosure more clearly, and do not constitute a limitation on the technical solutions according to the embodiments of the disclosure. The evolution of new business scenarios and the emergence of new service scenarios, the technical solutions according to the embodiments of the disclosure are also applicable to similar technical problems.

In the related art, when sidelink communication is used between two devices, a sending device needs to send sidelink control information (SCI) to a receiving device, so as to ensure that the receiving device may normally receive data and successfully demodulate the data. The sidelink control information includes a first type of SCI and a second type of SCI. The first type of SCI may also be referred to as a 1st part of SCI, or a 1st stage SCI. Correspondingly, the second type of SCI may also be referred to as a 2nd part of SCI or a 2nd stage SCI.

The receiving device needs to demodulate the first type of SCI, and determine a format and size of the second type of SCI as well as a location and size of time and frequency resources occupied by the second type of SCI, according to information contained in the first type of SCI, and demodulate the second type of SCI.

The types of sidelink communication include a unicast, a multicast, and a broadcast. For the unicast and multicast communication, the receiving device needs to ensure correct data transmission based on HARQ feedback after receiving the data sent by the sending device.

For the unicast communication, the receiving device feeds back acknowledge (ACK) information when data reception is successful, and feeds back non-Acknowledge (NACK) information when data reception fails.

For the multicast communication, two different HARQ feedback modes are defined, i.e., HARQ feedback mode 1 and HARQ feedback mode 2. In the HARQ feedback mode 1, the receiving device for multicast communication feeds back NACK information when data demodulation fails, and does not feedback information in other situations. In the HARQ feedback mode 2, the receiving device for multicast communication feeds back ACK information when the data reception is successful, and feedback NACK information when data reception fails.

For a device using multicast communication, the sending device needs SCI to indicate the receiving device which HARQ feedback mode is used for feedback. In the related art, the HARQ feedback mode may be indicated by setting a related field in the first type of SCI or in the second type of SCI. This indication method by fixed use of the first type of SCI or the second type of SCI is not flexible enough.

FIG. 2 is a flowchart of a method for indicating a feedback mode according to an embodiment. The method may be performed by a first device. For example, the first device may be the terminal in FIG. 1 or a vehicle-mounted communication device in a vehicle. Referring to FIG. 2, the method includes the following steps at 201-202.

At 201, the first device obtains configuration information, where the configuration information is configured to indicate whether the first device supports an optional function of HARQ feedback.

At 202, the first device sends sidelink control information (SCI) to a second device based on the configuration information. The SCI includes a first type of SCI and a second type of SCI, and one of the first type of SCI and the second type of SCI includes a first field, where the first field is configured to indicate a HARQ feedback mode for data transmission in multicast communication.

Alternatively, the configuration information indicates that the first device supports the optional function of HARQ feedback, and the first type of SCI includes the first field; or the configuration information indicates that the first device does not support the optional function of HARQ feedback, and the second type of SCI includes the first field.

Alternatively, the first type of SCI includes the first field, and the first field further indicates a format of the second type of SCI.

Alternatively, different HARQ feedback modes for data transmission in multicast communication associated with the SCI correspond to different formats of the second type of SCI and different values of the first field.

Alternatively, the first field has four values corresponding to four formats of the second type of SCI, respectively. The four formats of the second type of SCI correspond to broadcast communication, unicast communication, multicast communication based on the HARQ feedback mode 1, and multicast communication based on the HARQ feedback mode 2, respectively. Alternatively, the first field has three values corresponding to three formats of the second type of SCI, respectively. The three formats of the second type of SCI correspond to broadcast communication, multicast communication based on the HARQ feedback mode 1, unicast communication, and multicast communication based on the HARQ feedback mode 2 respectively.

Alternatively, the second type of SCI includes the first field, the first type of SCI or the second type of SCI includes a second field. The second field indicates a type of sidelink communication.

Alternatively, the configuration information is information received by the first device and sent by the access network device, or information preconfigured in the first device.

Alternatively, the optional function is to perform HARQ feedback according to a distance between a receiving end and a sending end.

It should be noted that the foregoing steps at 201-202 may be combined arbitrarily with the foregoing alternative steps.

FIG. 3 is a flowchart of a method for determining a feedback mode according to an embodiment. The method may be performed by a second device. For example, the second device may be the terminal in FIG. 1 or a vehicle-mounted communication device in a vehicle. Referring to FIG. 3, the method includes the following steps at 301-302.

At 301, the second device receives sidelink control information (SCI) sent by a first device. The SCI includes a first type of SCI and a second type of SCI, and one of the first type of SCI and the second type of SCI includes a first field, where the first field is configured to indicate a hybrid automatic repeat request (HARQ) feedback mode for data transmission in multicast communication.

At 302, the second device determines the HARQ feedback mode for data transmission in multicast communication associated with the SCI, based on configuration information and the first field in the SCI. The configuration information is configured to indicate whether the second device supports an optional function of HARQ feedback.

Alternatively, the first type of SCI includes the first field, and the first field further indicates a format of the second type of SCI.

Alternatively, different HARQ feedback modes for data transmission in multicast communication associated with the SCI correspond to different formats of the second type of SCI and different values of the first field.

Alternatively, the first field has four values corresponding to four formats of the second type of SCI respectively. The four formats of the second type of SCI correspond to broadcast communication, unicast communication, multicast communication based on the HARQ feedback mode 1, and multicast communication based on the HARQ feedback mode 2, respectively. Alternatively, the first field has three values corresponding to three formats of the second type of SCI, respectively. The three formats of the second type of SCI correspond to broadcast communication, multicast communication based on the HARQ feedback mode 1, unicast communication, and multicast communication based on the HARQ feedback mode 2 respectively.

Alternatively, determining by the second device, the HARQ feedback mode for multicast communication based on the SCI and configuration information, includes:

when the configuration information indicates that the second device supports the optional function of HARQ feedback, determining the format of the second type of SCI and the corresponding HARQ feedback mode for multicast communication based on the value of the first field in the first type of SCI; or when the configuration information indicates that the second device supports the optional function of HARQ feedback, and there are time-frequency resources for sending HARQ feedback information in a sidelink communication resource pool, determining the format of the second type of SCI and the corresponding HARQ feedback mode for multicast communication based on the first field in the first type of SCI; or when the configuration information indicates that the second device does not support the optional function of HARQ feedback or there are no time-frequency resources for sending HARQ feedback information in the sidelink communication resource pool, determining the HARQ feedback mode for multicast communication based on the first field in the second type of SCI.

Alternatively, the second type of SCI includes the first field, and the first type of SCI or the second type of SCI includes a second field. The second field indicates a type of sidelink communication.

Alternatively, the configuration information is information received by the second device and sent by the access network device, or information preconfigured in the second device.

Alternatively, the optional function is to perform HARQ feedback according to a distance between a receiving end and a sending end.

It should be noted that the foregoing steps 301-302 may be combined arbitrarily the foregoing alternative steps.

FIG. 4 is a flowchart of a method for indicating and determining a feedback mode according to an embodiment. The method may be executed jointly by a first device and a second device. In an example, the first device may be the terminal in FIG. 1 or the vehicle-mounted communication device in a vehicle, and the second device may also be the terminal in FIG. 1 or the vehicle-mounted communication device in the vehicle. Referring to FIG. 4, the method includes the following step at 401-404.

At 401, the first device obtains configuration information.

The configuration information is configured to indicate whether the first device supports an optional function of HARQ feedback. In the embodiment of the disclosure, the optional function of HARQ feedback may refer to a function of performing HARQ feedback according to conditions other than successful data transmission and failed data transmission. In an example, the optional function may be to perform HARQ feedback according to a distance between a receiving end and a sending end.

In a possible implementation, the configuration information may be configuration information received by the first device and sent by the access network device. After receiving the configuration information, the first device may store the configuration information in a local storage device, and read the configuration information from the local storage device when the configuration information needs to be used later. That is, the optional function of HARQ feedback may be enabled or disabled by the access network device.

In another possible implementation, the configuration information may be preconfigured in the first device. The optional function of HARQ feedback may also be enabled or disabled according to the preconfigured configuration information.

Alternatively, when the first device is under a coverage of a cellular network, the first device may receive a downlink signaling sent by the access network device, and obtain configuration information in the downlink signaling; when the first device is outside the coverage of the cellular network, the configuration information preconfigured in the terminal may be obtained.

At 402, the first device sends sidelink control information (SCI) to the second device based on the configuration information.

In the embodiment of the disclosure, the SCI includes the first type of SCI and the second type of SCI, and one of the first type of SCI and the second type of SCI includes a first field, where the first field is configured to indicate a HARQ feedback mode for data transmission in multicast communication.

Alternatively, the configuration information indicates that the first device supports the optional function of HARQ feedback, and the first type of SCI includes the first field; or the configuration information indicates that the first device does not support the optional function of HARQ feedback, and the second type of SCI includes the first field.

Correspondingly, the step at 402 may include: when the configuration information indicates that the first device supports the optional function of HARQ feedback, the first type of SCI and the second type of SCI are sent, and the first type of SCI includes the first field; or when the configuration information indicates that the first device does not support the optional function of HARQ feedback, the first type of SCI and the second type of SCI are sent, and the second type of SCI includes the first field.

In a possible implementation, when the first type of SCI includes the first field, where the first field may be a newly added field. In an example, the length of the newly added field may be 1 bit, and the newly added field has two values, respectively corresponding to the two feedback modes for multicast communication.

In another possible implementation, when the first type of SCI includes the first field, existing fields in the first type of SCI (that is, fields that carry other information), may be determined as the first field. For example, a field for indicating the format of the second type of SCI is determined as the first field. In other words, the first field may also be configured to indicate the format of the second type of SCI.

In the embodiment of the disclosure, when the first device supports the optional function of HARQ feedback, in response to the first device indicating the second device to perform HARQ feedback in the feedback mode 1, a field corresponding to the optional function may be carried in the second type of SCI; in response to the first device indicating the second device to perform HARQ feedback in the feedback mode 2, a field corresponding to the optional function may not be carried in the second type of SCI.

For example, when the first device supports the optional function of performing HARQ feedback according to the distance between the receiving end and the sending end, the second type of SCI includes fields for indicating a UE geographic location of the sending end and a transmission distance threshold. The receiving end determines the distance between the sending end and the receiving end according to its own geographic location, and compares the determined distance with the transmission distance threshold. When the determined distance is less than the transmission distance threshold, HARQ feedback is performed. When the determined distance is not less than the transmission distance threshold, HARQ information is not fed back. When the first device does not support the optional function of HARQ feedback based on the distance between the receiving end and the sending end, the second type of SCI does not include the fields for indicating the UE geographic location of the sending end and the transmission distance threshold.

Therefore, for different feedback modes of sidelink communication, the format and size of the second type of SCI are quitely different. That is, when the device supports the optional function of HARQ feedback, the feedback mode of multicast data may affect the format of the second type of SCI. As different types of sidelink communication may correspond to different formats and sizes of the second type of SCI, the formats and sizes of the second type of SCI are also quite different for different types (including unicast, multicast and broadcast) of sidelink communication.

When the formats and sizes of the second type of SCI are quite different, the first type of SCI needs to include a field for indicating the format of the second type of SCI, so as to ensure that the second device may correctly demodulate data. In this situation, the field for indicating the format of the second type of SCI may be multiplexed into the first field, so as to reduce the size of the first type of SCI. Since the second device needs to first demodulate the first type of SCI, then demodulate the second type of SCI according to the information in the first type of SCI, and then demodulate the data according to the second type of SCI. Devices other than the first device and the second device also need to demodulate at least the first type of SCI for sensing to perform resource selection. Thus, the information in the first type of SCI is relatively more important, and a small size of the first type of SCI is beneficial to improve data transmission performance. At the same time, enabling the first field to be included in the first type of SCI and not included in the second type of SCI, may avoid a large number of useless information fields to appear the second type of SCI, which is beneficial to improve the efficiency of data transmission.

In this embodiment of the disclosure, the format of the SCI may refer to the number of fields included in the SCI and the content of fields, the length of each field, and the sequence order of each field.

In the case that the first field may also be configured to indicate the format of the second type of SCI, different HARQ feedback modes for data transmission in multicast communication, which is associated with the SCI sent by the first device, correspond to different formats of the second type of SCI and different values of the first field.

In a possible implementation, the first field has four values corresponding to four formats of the second type of SCI respectively. The four formats of the second type of SCI correspond to broadcast communication, unicast communication, multicast communication based on the HARQ feedback mode 1, and multicast communication based on the HARQ feedback mode 2 respectively. In this embodiment, the length of the first field may be 2 bits, and the four values are 00, 01, 10, and 11, respectively.

In another possible implementation, the first field has three values corresponding to three formats of the second type of SCI respectively. The three formats of the second type of SCI correspond to broadcast communication, multicast communication based on the HARQ feedback mode 1, unicast communication, and multicast communication based on the HARQ feedback mode 2, respectively. In this embodiment, the length of the first field may be 2 bits, any three of the values 00, 01, 10 and 11, and the remaining one may be reserved or used to indicate other information.

When the first device does not support the optional function of HARQ feedback, no matter which feedback mode is used, fields related to the optional function do not need to be included. Therefore, the formats and sizes of the second type of SCI that correspond to different feedback modes are relatively consistent, and the formats and sizes of the second type of SCI that correspond to unicast communication and multicast communication are also relatively consistent. In this case, the first field may be carried in the second type of SCI in order to reduce the size of the first type of SCI.

For example, in the second type of SCI, the length of the first field may be 1 bit. The first field has two values, corresponding to multicast communication based on the feedback mode 1 and multicast communication based on the feedback mode 2 respectively.

Alternatively, when the second type of SCI includes the first field, the first type of SCI or the second type of SCI includes a second field, where the second field is configured to indicate the type of sidelink communication.

In a possible implementation, the first type of SCI includes the second field, the length of the second field may be 1 bit, and the second field has two values, corresponding to broadcast communication and non-broadcast communication. The second device may determine the type of sidelink communication according to the second field, and then determine the format of the second type of SCI. Compared with the first type of SCI including the first field, the size of the first type of SCI including the second field is relatively small, which may further improve data transmission performance.

Here, the non-broadcast communication includes multicast communication and unicast communication. The second device may also distinguish the multicast communication from the unicast communication through a physical layer target ID and/or a physical layer source ID area in the second type of SCI. The second type of SCI includes a third field for indicating the type of non-broadcast communication (i.e., unicast communication and multicast communication). The length of the third field may be 1 bit. The second device may distinguish the unicast communication from the multicast communication by the value of the third field.

During unicast communication, the 1 bit corresponding to the second field in the first type of SCI may be invalid, or be set to zero, or be used to indicate other information.

In this embodiment of the disclosure, the first type of SCI may be transmitted through a physical sidelink control channel (PSCCH). The second type of SCI may be transmitted through a physical sidelink shared channel (PSSCH), and be demodulated by using a demodulation reference signal (DMRS) on the PSSCH.

At 403, the second device receives SCI sent by the first device.

The related description of the SCI may be referred to the step at 402, which is not repeated here.

At 404, the second device determines a HARQ feedback mode for data transmission in multicast communication associated with the SCI, based on the configuration information and the first field in the SCI.

The configuration information at 404 is configured to indicate whether the second device supports the optional function of HARQ feedback. The related content of the configuration information may be referred to the step at the step 401, which is not repeated here.

For the second device, the configuration information may be used by the second device to determine whether the first field is in the first type of SCI or in the second type of SCI, where the first field is configured to indicate the HARQ feedback mode of the multicast communication.

In a possible implementation, the first field is configured to indicate the format of the second type of SCI, then step 404 may include:

when the configuration information indicates that the second device supports the optional function of HARQ feedback, determining the format of the second type of SCI and the corresponding HARQ feedback mode for data transmission in multicast communication based on the value of the first field in the first type of SCI; or when the configuration information indicates that the second device supports the optional function of HARQ feedback, and there are time-frequency resources for sending HARQ feedback information in a sidelink communication resource pool, determining the format of the second type of SCI and the corresponding HARQ feedback mode for multicast communication based on the first field in the first type of SCI; or when the configuration information indicates that the second device does not support the optional function of HARQ feedback, or there are no time-frequency resources for sending HARQ feedback information in the sidelink communication resource pool, determining the HARQ feedback mode for multicast communication based on the first field in the second type of SCI.

Here, when there are no time-frequency resources for sending HARQ feedback information in the sidelink communication resource pool, HARQ feedback is not supported by default.

In another possible implementation, when the first field in the first type of SCI is a newly added field, according to the value of the first field, the HARQ feedback mode for multicast communication may be determined, while the format of the second type of SCI may not be determined.

In the embodiment of the disclosure, according to the configuration information for indicating whether the first device supports the optional function of HARQ feedback, the first device selects whether the first type of SCI nor the second type of SCI is used for carrying the first field, which indicates the HARQ feedback mode for data transmission in multicast communication. This indication method is flexible. The second device may accurately determine the feedback mode for multicast communication according to the configuration information for indicating whether the second device supports the optional function of HARQ feedback and the first field in the SCI.

In addition, when the first device and the second device support the optional function of HARQ feedback, the first field is included in the first type of SCI, and the first field is also configured to indicate the format of the second type of SCI, so that the first type of SCI may carry as much information as possible when its size is small, which is beneficial to improving the data transmission performance of the system, and carrying useless fields in the second type of SCI may be avoided, which is beneficial to improve the efficiency of data transmission. When the first device and the second device do not support the optional function of HARQ feedback, including the first field in the second type of SCI may further reduce the size of the first type of SCI, thus improving the data transmission performance of the system.

Figure 5:
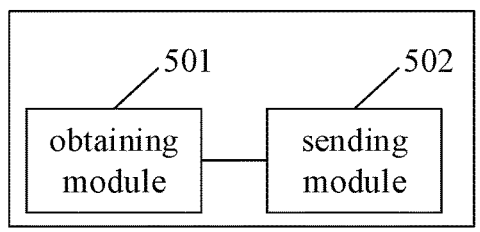
FIG. 5 is a structural schematic diagram of an apparatus for indicating a feedback mode according to an example.

FIG. 5 is a structural schematic diagram of an apparatus for indicating a feedback mode according to an embodiment. The apparatus has a function of implementing the first device in the above method embodiments, and the function may be implemented by hardware, or by executing corresponding software in hardware. As shown in FIG. 5, the apparatus includes: an obtaining module 501 and a sending module 502.

The obtaining module 501 is configured to obtain configuration information, where the configuration information is configured to indicate whether the first device supports an optional function of hybrid automatic repeat request (HARQ) feedback.

The sending module 502 is configured to send sidelink control information (SCI) to a second device based on the configuration information. The SCI includes the first type of SCI and the second type of SCI, one of the first type of SCI and the first type of SCI includes a first field, and the first field is configured to indicate a HARQ feedback mode for data transmission in multicast communication.

Alternatively, the configuration information indicates that the first device supports the optional function of HARQ feedback, and the first type of SCI includes the first field; or the configuration information indicates that the first device does not support the optional function of HARQ feedback, and the second type of SCI includes the first field.

Alternatively, the first type of SCI includes the first field, where the first field further indicates a format of the second type of SCI.

Alternatively, different HARQ feedback modes for data transmission in multicast communication associated with the SCI correspond to different formats of the second type of SCI and different values of the first field.

Alternatively, the first field has four values corresponding to four formats of the second type of SCI respectively, and the four formats of the second type of SCI correspond to broadcast communication, unicast communication, multicast communication based on HARQ feedback mode 1, and multicast communication based on HARQ feedback mode 2; or the first field has three values corresponding to three formats of the second type of SCI respectively, and the three formats of the second type of SCI correspond to broadcast communication, multicast communication based on HARQ feedback mode 1, unicast communication, and multicast communication based on HARQ feedback mode 2 respectively.

Alternatively, the second type of SCI includes the first field, and the first type of SCI or the second type of SCI comprises a second field, where the second field indicates a type of sidelink communication.

Alternatively, the configuration information is information received by the first device and sent by the access network device, or information preconfigured in the first device.

Alternatively, the optional function is to perform HARQ feedback based on a distance between a receiving end and a sending end.

Figure 6:
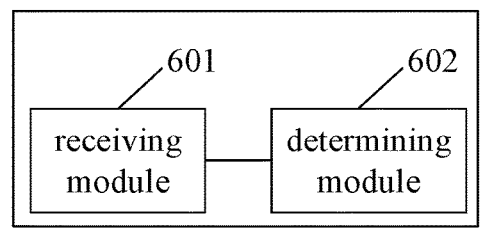
FIG. 6 is a structural schematic diagram of an apparatus for determining a feedback mode according to an example.

FIG. 6 is a structural schematic diagram of an apparatus for determining a feedback mode according to an embodiment. The apparatus has the function of implementing the second device in the above method embodiments, and the function may be implemented by hardware, or by executing corresponding software in hardware. As shown in FIG. 6, the apparatus includes: a receiving module 601 and a determining module 602.

The receiving module 601 is configured to receive sidelink control information (SCI) sent by a first device. The SCI includes a first type of SCI and a second type of SCI, one of the first type of SCI and the second type of SCI includes a first field, and the first field is configured to indicate a hybrid automatic repeat request (HARQ) feedback mode for data transmission in multicast communication.

The determining module 602 is configured to determine the HARQ feedback mode for data transmission in multicast communication associated with the SCI, based on configuration information and the first field in the SCI. The configuration information is configured to indicate whether the second device supports an optional function of HARQ feedback.

Alternatively, the first type of SCI includes the first field, and the first field further indicates a format of the second type of SCI.

Alternatively, different HARQ feedback modes for data transmission in multicast communication associated with the SCI correspond to different formats of the second type of SCI and different values of the first field.

Alternatively, the first field has four values corresponding to four formats of the second type of SCI respectively, and the four formats of the second type of SCI correspond to broadcast communication, unicast communication, multicast communication based on HARQ feedback mode 1, and multicast communication based on HARQ feedback mode 2; or the first field has three values corresponding to three formats of the second type of SCI respectively, and the three formats of the second type of SCI correspond to broadcast communication, multicast communication based on HARQ feedback mode 1, unicast communication, and multicast communication based on HARQ feedback mode 2 respectively.

Alternatively, the determining module 602 is configured to:

when the configuration information indicates that the second device supports the optional function of HARQ feedback, determine the format of the second type of SCI and the HARQ feedback mode for multicast communication based on the value of the first field in the first type of SCI; or when the configuration information indicates that the second device supports the optional function of HARQ feedback, and there are time-frequency resources for sending HARQ feedback information in a sidelink communication resource pool, determine the format of the second type of SCI and the HARQ feedback mode for multicast communication based on the first field in the first type of SCI; or when the configuration information indicates that the second device does not support the optional function of HARQ feedback or there are no time-frequency resources for sending HARQ feedback information in the sidelink communication resource pool, determine the HARQ feedback mode for multicast communication based on the first field in the second type of SCI.

Alternatively, the second type of SCI includes the first field, and the first type of SCI or the second type of SCI includes a second field. The second field indicates a type of sidelink communication.

Alternatively, the configuration information is information received by the second device and sent by the access network device, or information preconfigured in the second device.

Alternatively, the optional function is to perform HARQ feedback based on a distance between a receiving end and a sending end.

Regarding the apparatus in the above-mentioned embodiment, the specific manner in which each module performs operations has been described in detail in the embodiment of the method, which may not be described in detail here.

Figure 7:
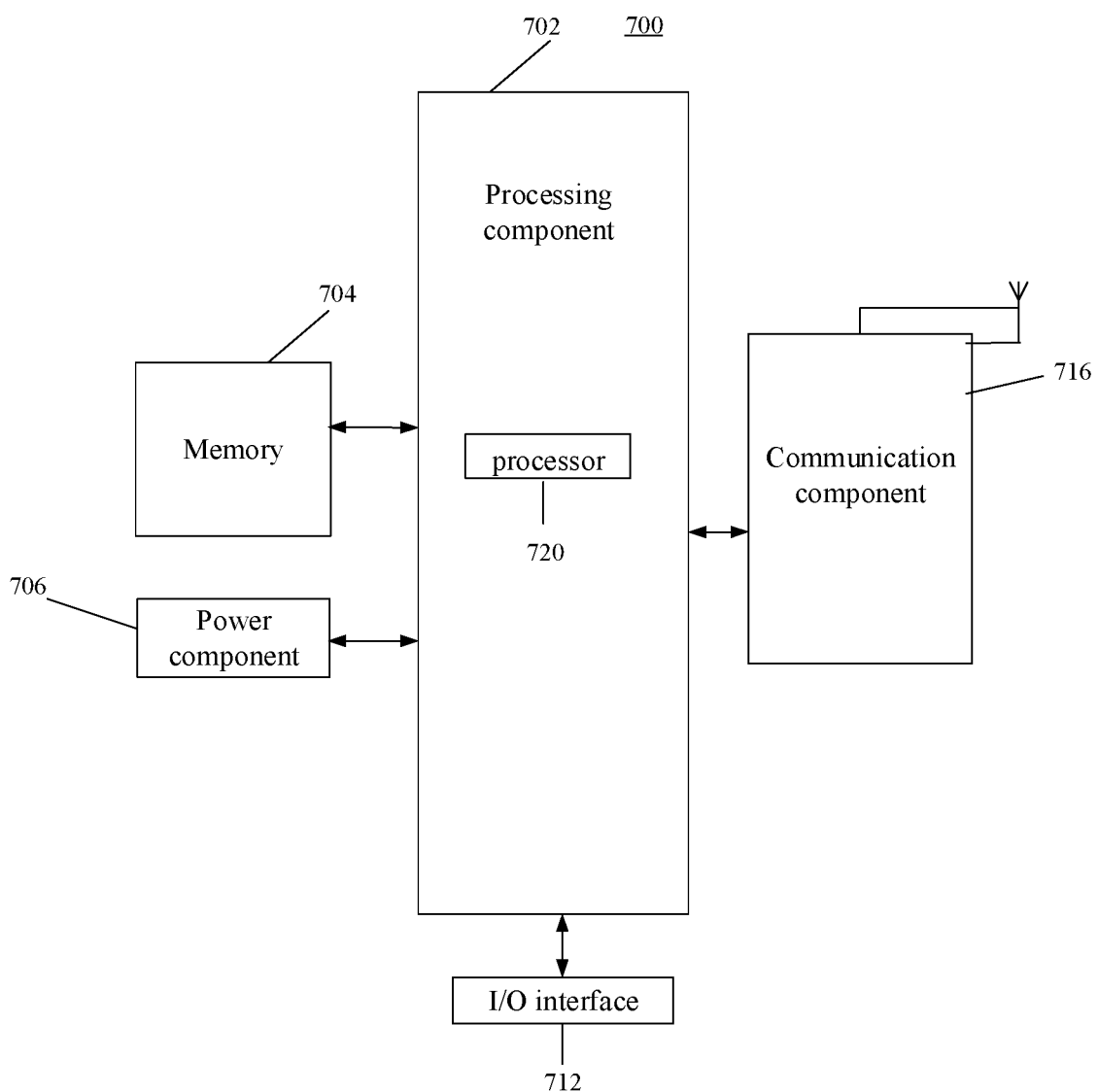
FIG. 7 is a block diagram of a device for indicating or determining a feedback mode according to an example.

FIG. 7 is a block diagram of a device 700 for determining a feedback manner according to an embodiment, and the device 700 may be the aforementioned first device. Referring to FIG. 7, the device 700 may include one or more of the following components: a processing component 702, a memory 704, a power component 706, an input/output (I/O) interface 712, and a communication component 716.

The processing component 702 generally controls overall operations of the device 700, such as the operations associated with display, phone calls, data communications, camera operations, and recording operations. The processing component 702 may include one or more processors 720 to execute instructions to perform all or some of the steps of the methods described above. Moreover, the processing component 702 may include one or more modules that facilitate interactions between the processing component 702 and other components. For example, the processing component 702 may include a multimedia module to facilitate interactions between the multimedia component 707 and the processing component 702.

The memory 704 is configured to store various types of data to support operation at device 700. The memory 704 may be implemented by any type of volatile or non-volatile storage device or combination thereof, such as a static random-access memory (SRAM), an electrically-erasable programmable read only memory (EEPROM), an erasable programmable read only memory (EPROM), a programmable read only memory (PROM), a read only memory (ROM), a magnetic memory, a flash memory, a magnetic or optical disk.

The power component 706 provides power to various components of device 700. The power components 706 may include a power management system, one or more power sources, and other components associated with the generation, management, and distribution of power in the device 700.

The I/O interface 712 provides an interface between the processing component 702 and a peripheral interface module, which may be a keyboard, a click wheel, a button, etc. The buttons may include but are not limited to, a home button, a volume button, a start button and a lock button.

The communication component 716 is configured to facilitate wireless communication between access network devices and other devices. In an embodiment of the disclosure, the communication component 716 may provide a wireless network based on a communication standard, such as 2G, 3G, 4G or 5G-NR, or their combination, so as to connect with the terminal device.

In an embodiment, the feedback mode determining apparatus 700 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic components are implemented to implement the above method for indicating a feedback mode or method for determining a feedback mode.

In an embodiment, a non-transitory computer-readable storage medium including instructions is also provided, such as a memory 704 including instructions, and the above-mentioned instructions may be executed by the processor 720 of the device 700 for indicating a feedback mode, so that the above-mentioned method for indicating a feedback mode is executed. Alternatively, the above instruction may be executed by the processor 720 of the device 700 for determining a feedback mode, so that the above-mentioned method for determining a feedback mode is executed. For example, the non-transitory computer-readable storage medium may be a ROM, a random access memory (RAM), a CD-ROM, a magnetic tape, a floppy disc, an optical data storage device, and the like.

An embodiment of the disclosure further provides a communication system including the aforementioned first device and second device.

Those skilled in the art will be aware of other embodiments of the disclosure after considering the specification and practicing the disclosure disclosed herein. The disclosure is intended to cover any variations, uses, or adaptive changes of the disclosure, which follow the general principles of the disclosure and include common knowledge or conventional technical means in the technical field not disclosed herein. The description and the embodiments are to be regarded as exemplary, and the true scope and spirit of the disclosure are indicated in the following claims.

It should be understood that the disclosure is not limited to the precise structures described above and illustrated in the accompanying drawings, and that various modifications and changes may be made without departing from its scope. The scope of the disclosure is limited by the appended claims.

The invention claimed is:

1. A method for indicating a feedback mode, comprising:
   obtaining, by a first device, configuration information, wherein the configuration information is configured to indicate whether the first device supports an optional function of hybrid automatic repeat request (HARQ) feedback, and the optional function is configured to perform HARQ feedback based on a distance between a receiving end and a sending end; and
   sending, by the first device, sidelink control information (SCI) to a second device based on the configuration information, wherein the SCI comprises a first type of SCI and a second type of SCI, one of the first type of SCI or the second type of SCI comprises a first field, and the first field is configured to indicate a HARQ feedback mode for data transmission in multicast communication;
   wherein when the configuration information indicates that the first device supports the optional function of HARQ feedback, the first type of SCI comprises the first field; and
   when the configuration information indicates that the first device does not support the optional function of HARQ feedback, the second type of SCI comprises the first field.

2. The method of claim 1, wherein when the first type of SCI comprises the first field, the first field indicates a format of the second type of SCI.

3. The method of claim 2, wherein different HARQ feedback modes for data transmission in multicast communication associated with the SCI correspond to different formats of the second type of SCI and different values of the first field.

4. The method of claim 2, wherein the first field comprises four values corresponding to four formats of the second type of SCI respectively, and the four formats of the second type of SCI correspond to broadcast communication, unicast communication, multicast communication based on HARQ feedback mode 1, and multicast communication based on HARQ feedback mode 2; or
   the first field comprises three values corresponding to three formats of the second type of SCI respectively, and the three formats of the second type of SCI correspond to broadcast communication, multicast communication based on HARQ feedback mode 1, and unicast communication and multicast communication based on HARQ feedback mode 2.

5. The method of claim 1, wherein when the second type of SCI comprises the first field, and the first type of SCI or the second type of SCI comprises a second field, wherein the second field indicates a type of sidelink communication.

6. The method of claim 1, wherein the configuration information is information received by the first device and sent by the access network device, or information preconfigured in the first device.

7. A method for determining a feedback mode, comprising:
   receiving, by a second device, sidelink control information (SCI) sent by a first device, wherein the SCI comprises a first type of SCI and a second type of SCI, one of the first type of SCI or the second type of SCI comprises a first field, and the first field is configured to indicate a hybrid automatic repeat request (HARQ) feedback mode for data transmission in multicast communication; and
   determining, by the second device, the HARQ feedback mode for data transmission in multicast communication associated with the SCI, based on configuration information and the first field in the SCI, wherein the configuration information is configured to indicate whether the second device supports an optional function of HARQ feedback, and the optional function is configured to perform HARQ feedback based on a distance between a receiving end and a sending end;

wherein when the configuration information indicates that the second device supports the optional function of HARQ feedback, the first type of SCI comprises the first field; and when the configuration information indicates that the second device does not support the optional function of HARQ feedback, the second type of SCI comprises the first field.

8. The method of claim 7, wherein when the first type of SCI comprises the first field, the first field indicates a format of the second type of SCI.

9. The method of claim 8, wherein different HARQ feedback modes for data transmission in multicast communication associated with the SCI correspond to different formats of the second type of SCI and different values of the first field.

10. The method of claim 9, wherein
the first field has four values corresponding to four formats of the second type of SCI respectively, and the four formats of the second type of SCI correspond to broadcast communication, unicast communication, multicast communication based on HARQ feedback mode 1, and multicast communication based on HARQ feedback mode 2; or the first field has three values corresponding to three formats of the second type of SCI respectively, and the three formats of the second type of SCI correspond to broadcast communication, multicast communication based on HARQ feedback mode 1, and unicast communication and multicast communication based on HARQ feedback mode 2.

11. The method of claim 9, wherein determining by the second device, the HARQ feedback mode for multicast communication comprises one of:

determining the format of the second type of SCI and the HARQ feedback mode for multicast communication based on the value of the first field in the first type of SCI, wherein the configuration information indicates that the second device supports the optional function of HARQ feedback;

determining the format of the second type of SCI and the HARQ feedback mode for multicast communication based on the first field in the first type of SCI, wherein the configuration information indicates that the second device supports the optional function of HARQ feedback, and a sidelink communication resource pool has time-frequency resources for sending HARQ feedback information; or determining the HARQ feedback mode for multicast communication based on the first field in the second type of SCI, wherein the configuration information indicates that the second device does not support the optional function of HARQ feedback or the sidelink communication resource pool has no time-frequency resources for sending HARQ feedback information.

12. The method of claim 7, wherein when the second type of SCI comprises the first field, the first type of SCI or the second type of SCI comprises a second field, wherein the second field indicates a type of sidelink communication.

13. The method of claim 7, wherein the configuration information is information received by the second device and sent by the access network device, or information preconfigured in the second device.

14. A first device for indicating a feedback mode, comprising:
a processor; and
a non-transitory computer-readable storage medium coupled to the processor and storing programming instructions for execution by the processor, the programming instructions instruct the processor to:

obtain configuration information, wherein the configuration information is configured to indicate whether the first device supports an optional function of hybrid automatic repeat request (HARQ) feedback, and the optional function is configured to perform HARQ feedback based on a distance between a receiving end and a sending end; and send sidelink control information (SCI) to a second device based on the configuration information, wherein the SCI comprises a first type of SCI and a second type of SCI, one of the first type of SCI or the second type of SCI comprises a first field, and the first field is configured to indicate a HARQ feedback mode for data transmission in multicast communication;

wherein when the configuration information indicates that the first device supports the optional function of HARQ feedback, the first type of SCI comprises the first field; and when the configuration information indicates that the first device does not support the optional function of HARQ feedback, the second type of SCI comprises the first field.

15. The device of claim 14, wherein when the first type of SCI comprises the first field, the first field further indicates a format of the second type of SCI.

16. The device of claim 15, wherein different HARQ feedback modes for data transmission in multicast communication associated with the SCI correspond to different formats of the second type of SCI and different values of the first field.

17. The device of claim 15, wherein the first field comprises four values corresponding to four formats of the second type of SCI respectively, and the four formats of the second type of SCI correspond to broadcast communication, unicast communication, multicast communication based on HARQ feedback mode 1, and multicast communication based on HARQ feedback mode 2; or the first field comprises three values corresponding to three formats of the second type of SCI respectively, and the three formats of the second type of SCI correspond to broadcast communication, multicast communication based on HARQ feedback mode 1, and unicast communication and multicast communication based on HARQ feedback mode 2.

18. The device of claim 14, wherein when the second type of SCI comprises the first field, the first type of SCI or the second type of SCI comprises a second field, wherein the second field indicates a type of sidelink communication.

* * * * *